United States Patent
Suzuki et al.

[11] Patent Number: 6,089,206
[45] Date of Patent: Jul. 18, 2000

[54] IGNITION AND COMBUSTION CONTROL IN INTERNAL COMBUSTION ENGINE

[75] Inventors: Keisuke Suzuki, Kanagawa; Nobutaka Takahashi, Yokohama, both of Japan

[73] Assignee: Nissan Motor Co., Ltd., Yokohama, Japan

[21] Appl. No.: 09/110,483

[22] Filed: Jul. 7, 1998

[30] Foreign Application Priority Data

Jul. 8, 1997 [JP] Japan .................................... 9-182290

[51] Int. Cl.$^7$ .................................................. F02B 17/00
[52] U.S. Cl. .................... 123/295; 123/305; 123/406.47; 123/406.23
[58] Field of Search .................... 123/295, 305, 123/406.23, 406.47

[56] References Cited

U.S. PATENT DOCUMENTS

| 5,813,387 | 9/1998 | Minowa et al. .................... 123/436 |
| 5,875,756 | 3/1999 | Kamura et al. .................... 123/305 |
| 5,878,711 | 3/1999 | Kamura et al. .................... 123/305 |
| 5,896,840 | 4/1999 | Takahashi .................... 123/295 |

FOREIGN PATENT DOCUMENTS

| 62-110536 | 5/1987 | Japan . |
| 5-71381 | 3/1993 | Japan . |

*Primary Examiner*—John Kwon
*Attorney, Agent, or Firm*—Foley & Lardner

[57] ABSTRACT

In a combustion changeover of an internal combustion engine between a stratified combustion mode and a homogeneous combustion mode, an engine control system modifies an ignition timing to eliminate unwanted torque increase due to fuel increase. The controller determines an excess quantity, such as an excess factor of an actual intake air quantity with respect to a target intake air quantity, indicative of torque variation due to fuel increase, and determines an ignition timing modification quantity to eliminate the torque variation, in accordance with the excess quantity. With this modification quantity, the control system retards the ignition timing transiently and ensure smooth combustion changeover.

39 Claims, 12 Drawing Sheets rQa → PIPER1 CONVERSION TABLE
(EQUIVALENT RATIO CONSTANT)

PIPER → ΔADV CONVERSION TABLE rφ ⟶ PIPER 2 CONVERSION TABLE
( INTAKE AIR QUANTITY CONSTANT )

IGNITION AND COMBUSTION CONTROL IN INTERNAL COMBUSTION ENGINE

CROSS-REFERENCE TO RELATED APPLICATION

This application claims the priority of JP 9-182290 filed Jul. 8, 1997.

BACKGROUND OF THE INVENTION

The present invention relates to an internal combustion engine, and specifically to an electronically controlled engine equipped with a controlling system for controlling an ignition timing in a changeover of a combustion condition of an engine from one combustion mode to another.

Japanese Patent Provisional (Kokai) Publication No. 62(1987)-110536 shows a conventional engine control system arranged to determine a target engine torque in accordance with one or more engine operating conditions such as accelerator depression degree and engine speed, and to achieve the target torque by controlling a throttle opening with an electronically controlled throttle valve.

Japanese Patent Provisional (Kokai) Publication No. 5(1993)-71381 shows another conventional engine control system arranged to hold the torque constant or vary the torque smoothly in a changeover between lean air fuel ratio and stoichiometric air fuel ratio or between stratified combustion and homogeneous combustion. This system varies the air fuel ratio gradually to prevent an abrupt torque change due to stepwise changes in a target air fuel ratio and a target cylinder intake air quantity.

SUMMARY OF THE INVENTION

In the conventional technique, however, the rates of changes of the air fuel ratio and intake air quantity do not match each other, so that a stepwise torque difference is eased, but a desired torque is unobtainable. Furthermore, the use of an air fuel ratio deviated from an intended ratio makes worse the problem of emission, and the use of a great amount of EGR in a stratified charge combustion tends to deteriorate the stability of homogeneous combustion just after a combustion changeover.

It is therefore an objective of the present invention to provide an internal combustion engine or engine system capable of changing an engine combustion mode smoothly with satisfactory driveability and emission performance.

According to the present invention, an internal combustion engine comprises an actuating system for changing over an actual combustion mode of the engine; and a controller for modifying an ignition timing of the engine to compensate for a torque variation due to a variation of a fuel supply quantity in a changeover of the combustion mode. An engine control process for an internal combustion engine, comprises a changing step of changing over an actual combustion condition of the engine; and a ignition timing modifying step of modifying an ignition timing of the engine to compensate for a torque variation due to a variation of a fuel supply quantity in a changeover of the combustion mode.

The controller may comprise first means for estimation of excess torque or torque variation due to the variation of the fuel supply quantity in the changeover of the combustion mode, second means for calculation of an ignition timing modification quantity to eliminate the torque variation estimated by the first means, and third means for modification of the ignition timing of the engine by the ignition timing modification quantity, as shown in FIG. 1.

DETAILED DESCRIPTION OF THE INVENTION

Figure 1:
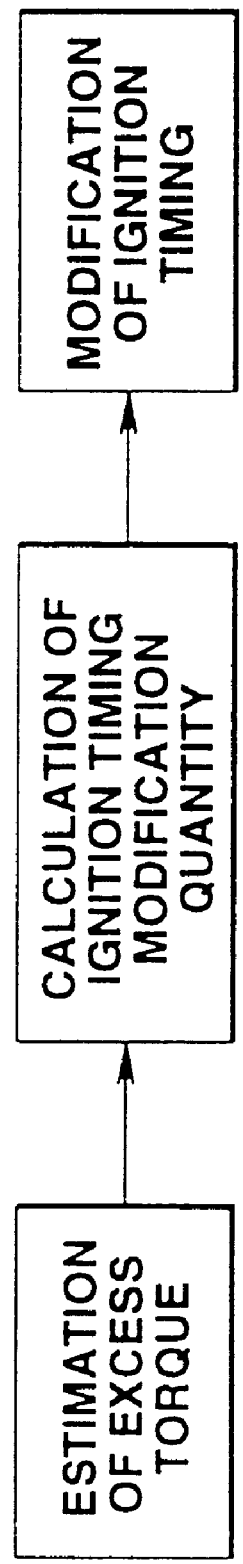
FIG. 1 is a block diagram for facilitating understanding one configuration of the present invention.
Figure 2:
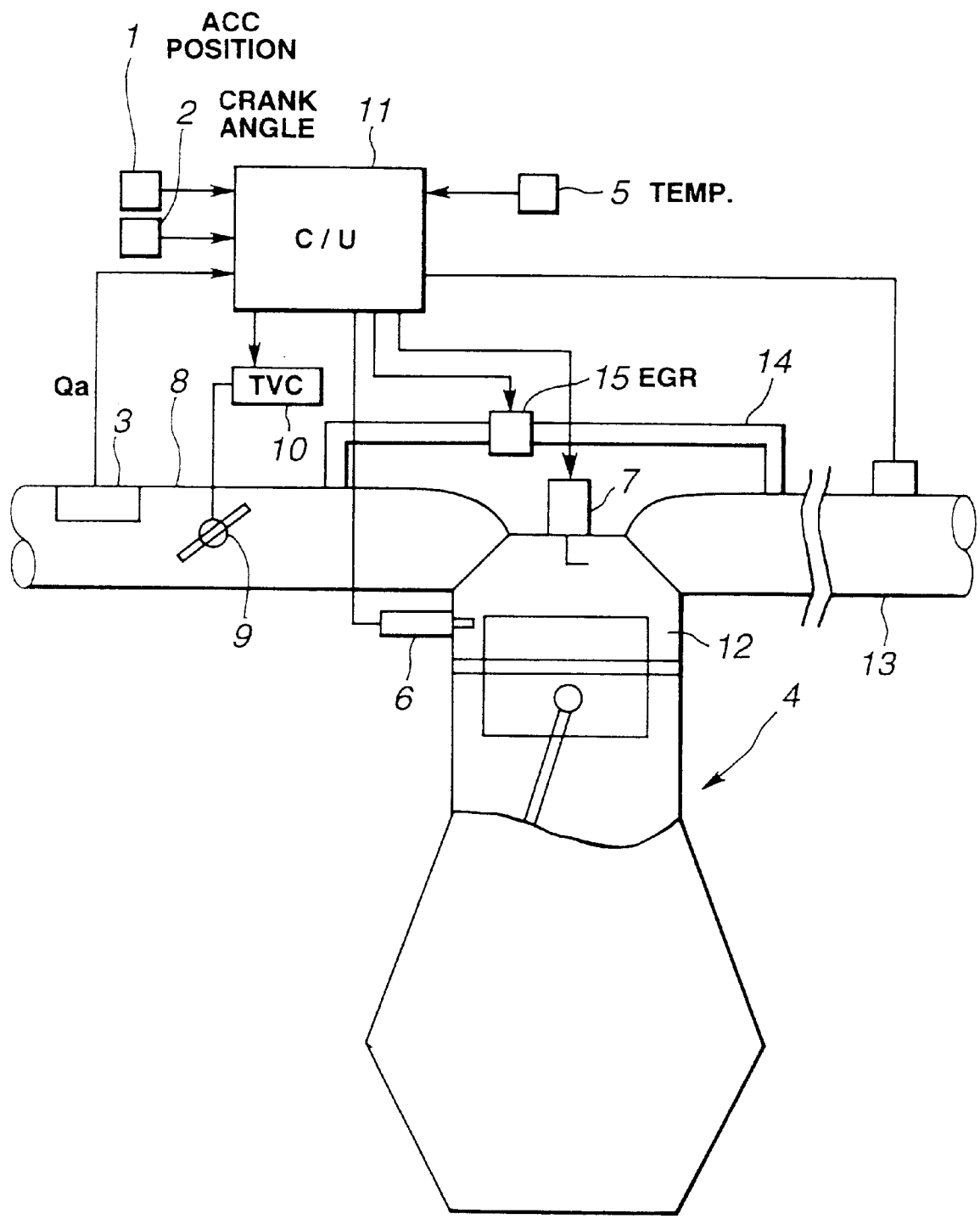
FIG. 2 is a schematic view showing an engine system according to one embodiment of the present invention.

FIG. 2 shows an internal combustion engine according to one embodiment of the present invention.

The internal combustion engine in this example is an engine system inclusive of a sensor section comprising a group of sensors, a controller section and an actuator section comprising devices serving as actuators. These sections form a control system.

The sensor section of this example comprises an accelerator position sensor 1 for sensing a position of an accelerating system of an engine (or engine proper) 4, a crank angle sensor 2, an air flow sensor (or air flow meter) 3 for sensing an intake air quantity for the engine 4, and a water temperature sensor 5 for sensing the temperature of an engine cooling water. The accelerator sensor 1 of this example senses a depression degree (or an opening degree) of an accelerator pedal of the vehicle. The crank angle sensor 2 of this example produces a position signal signaling each unit crank angle, and a reference signal signaling each cylinder stroke phase difference. The control system can determine the engine speed Ne by measuring the number of pulses per unit time of the position signal, or measuring the period of occurrence of pulses of the reference signal. The engine 4 comprises a fuel injector 6 and a spark plug 7 for each cylinder. In each cylinder, the fuel injector 6 injects fuel directly into a combustion chamber 12 of the engine 4 in response to a fuel injection control signal, and the spark plug 7 initiates ignition in the combustion chamber 12. The fuel injectors 6 are controlled in one of a stratified combustion mode and a homogeneous combustion mode. In low and medium engine load regions, the fuel injector 6 of each cylinder injects the fuel into the combustion chamber 12 in the compression stroke to produce a stratified combustible air fuel mixture closely around the spark plug 7 and thereby to achieve stratified combustion with very lean air fuel mixture. Under high load conditions, the fuel injector 6 of each cylinder is controlled in the homogeneous combustion mode, and injects the fuel into the combustion chamber 12 in the intake stroke to achieve homogeneous combustion to provide more power output. The fuel injectors 6 are components of a fuel injecting system of the engine, and can serve as actuators for controlling the combustion condition in the engine 4.

An intake system for the engine 4 comprises an intake air passage 8 and a throttle valve 9 disposed in the intake air passage 8 leading to the engine 4. A throttle control unit 10 is arranged to electronically control the opening degree of the throttle valve 9. The throttle control unit 10 and the throttle valve 9 can serve as an actuator for controlling an intake air quantity to the engine 4.

An engine control unit or engine controller 11 receives signals from the sensor section to collect input information on engine operating conditions, and controls the opening degree of the throttle valve 9 through the throttle control unit 10, the fuel supply quantity (that is, the fuel injection quantity in this example) and fuel injection timing of each fuel injector 6 and the ignition timing of each spark plug 7 in accordance with the engine operating conditions.

The engine control unit 11 is a main component in the controller section of the control system. In this example, the control unit 11 includes at least one computer including at least one central processing unit (CPU), a memory section having ROM and RAM and input and output sections.

The fuel injectors 6 are components of the fuel system of the engine 4, which in this example is the fuel injection system. The spark plugs 7 are components of the ignition system of the engine 4. The engine system further includes the exhaust system including at least an exhaust gas passage 13 of the engine, and an EGR (exhaust gas recirculating) system connecting the exhaust system with the intake system.

The EGR system of the engine 4 comprises an EGR passage 14 connecting the exhaust passage 12 with the intake passage 8, and an EGR control unit 15. The EGR control unit 15 comprises an EGR control valve disposed in the EGR passage 14 and electronically controls the opening of the EGR valve. The EGR control unit 15 varies the opening degree of the EGR valve and thereby controls the amount of EGR in response to an EGR control signal sent from the engine control unit 11. By producing the EGR control signal, the engine control unit 11 further controls the EGR condition of the engine 4.

Figure 3:
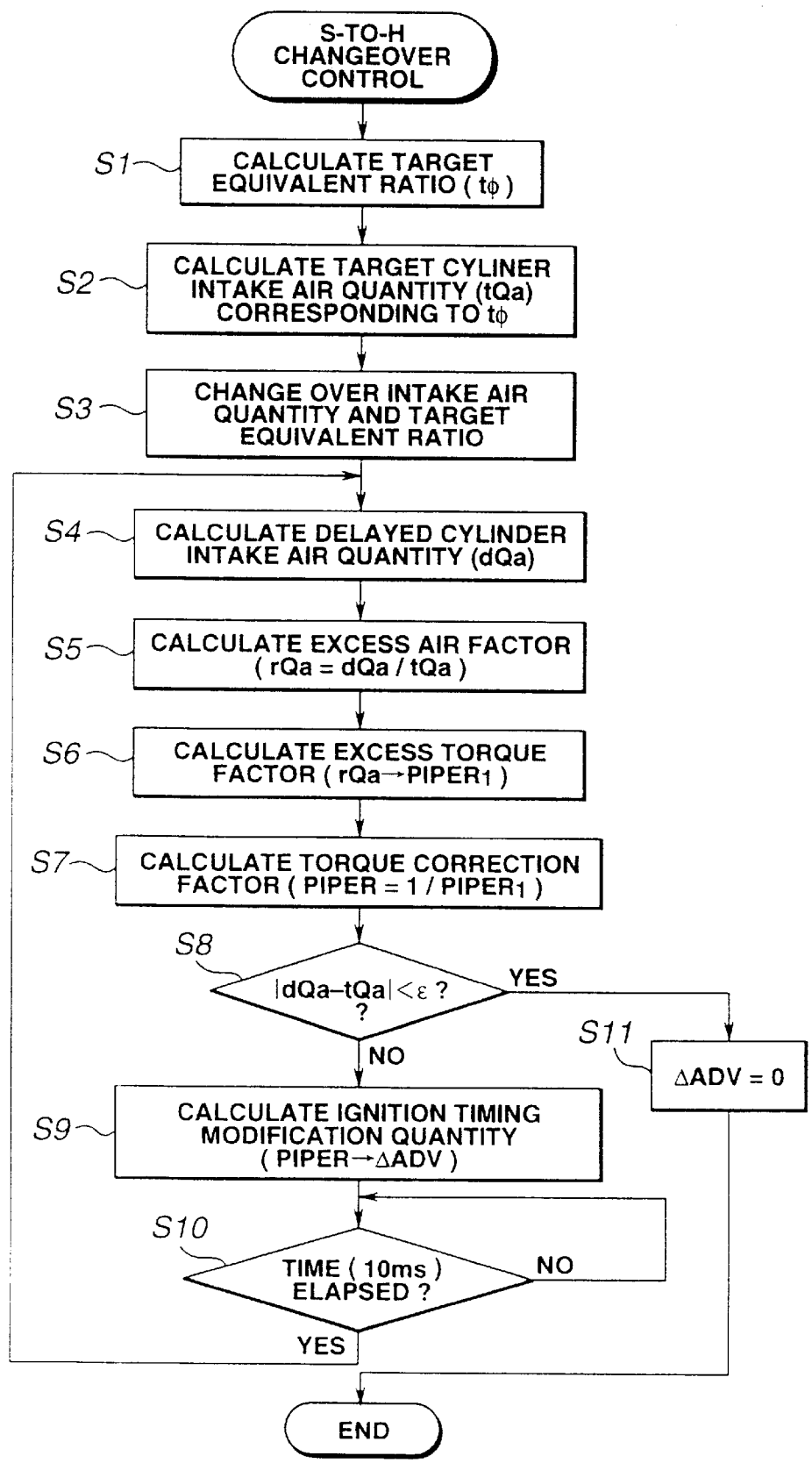
FIG. 3 is a flow chart showing a stratified-to-homogeneous combustion changeover control routine in a first practical example according to the embodiment.

In a first practical example according to this embodiment, the engine control unit 11 performs a routine of FIG. 3. In the case of a combustion changeover from the stratified charge combustion to the homogeneous charge combustion, the engine control system in this practical example decreases a cylinder intake air quantity to a target value corresponding to a target equivalent ratio of the homogeneous mode, and controls a fuel supply quantity to maintain the target equivalent ratio of the homogenous mode in pace with a lagging decrease in the actual cylinder intake air quantity. During the lag of the actual intake air quantity, this control system modifies the ignition timing to avoid an engine torque from being increased by the increase of the fuel supply quantity.

The routine of FIG. 3 is a combustion changeover control process performed by the control system. The engine control unit 11 executes the routine of FIG. 3 when a combustion changeover from the stratified mode to the homogeneous mode is requested in accordance with the current engine operating conditions.

At a step S1, the control unit 11 calculates a target equivalent ratio t$\phi$ for the homogeneous combustion mode in accordance with the current engine operating conditions (the engine speed and engine load). The equivalent ratio is a quantity proportional to a fuel/air ratio.

At a step S2, the control unit 11 calculates a target cylinder intake air quantity tQa corresponding to the target equivalent ratio t$\phi$.

At a step S3, the control unit 11 carries out a combustion changeover by storing the target cylinder intake air quantity tQa and the target equivalent ratio t$\phi$ in predetermined variables. This control system controls the intake air quantity and the equivalent ratio by following another job.

At a step S4, the control unit 11 calculates a delayed cylinder intake air quantity dQa in accordance with the target cylinder intake air quantity tQa. The actual intake air quantity to each cylinder of the engine cannot change immediately in response to a change in the throttle control signal (corresponding to an intake air control signal) because of a lag due to a lag in movement of the throttle valve 9 and a transportation lag of the intake air from the throttle valve 9 to the cylinder. The delayed cylinder intake quantity dQa is a variable representing the actual cylinder intake quantity.

At a step S5, the control unit 11 calculates an excess air factor rQa of the delayed cylinder intake air quantity dQa with respect to the target cylinder air quantity tQa. In this example, the control system employs, as an excess quantity, the excess air factor rQa (=dQa/tQa).

Figure 4:
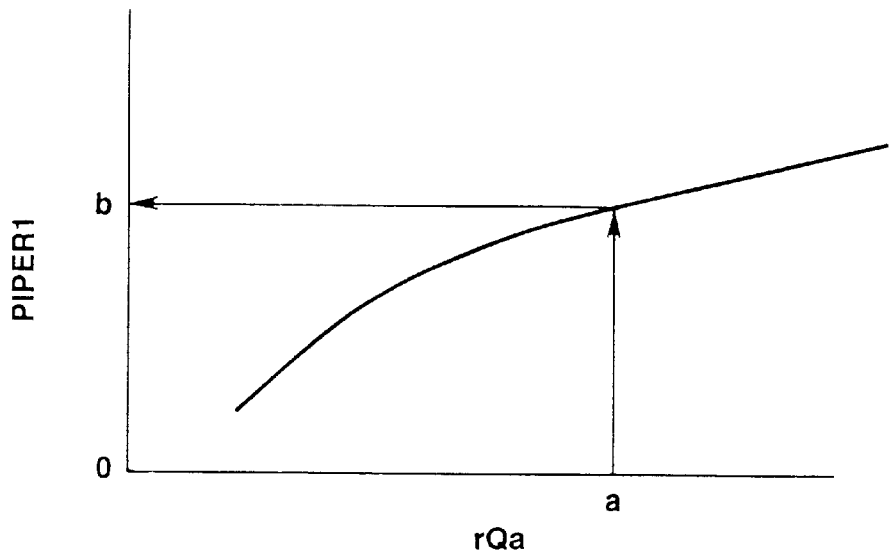
FIG. 4 is a view schematically showing a map used, in the stratified-to-homogeneous combustion changeover control routine of FIG. 3, for conversion from an excess air factor rQa to an excess torque factor PIPER1.

At a step S6, the control unit 11 calculates an excess torque factor PIPER1 from the excess air factor rQa, by information retrieval from a map as shown in FIG. 4. The excess torque factor PIPER1 increases as the excess air factor rQa increases as shown in FIG. 4. The excess torque factor PIPER1 is an excess factor of the torque obtained by the target equivalent ratio t$\phi$ and the delayed cylinder intake air quantity dQa representing the actual cylinder intake air quantity, with respect to the torque obtained by the target equivalent ratio t$\phi$ and the target cylinder intake air quantity tQa. In other words, the excess torque factor PIPER1 represents a factor or rate by which the actual torque (obtained without the ignition timing control) exceeds the target torque because of a lag in the intake air quantity.

At a step S7, the control unit 11 calculates a torque correction factor PIPER from the excess torque factor PIPER1. In this example, the torque correction factor PIPER is the reciprocal of the excess torque factor PIPER1. That is, PIPER=1/PIPER1. The torque correction factor PIPER is a correction factor to reduce a deviation of the actual torque from the target torque to zero.

At a step S8, the control unit 11 checks whether a difference (or deviation) |dQa−tQa| between the delayed cylinder intake air quantity dQa and the target cylinder intake air quantity tQa is smaller than a predetermined value $\epsilon$.

Figure 5:
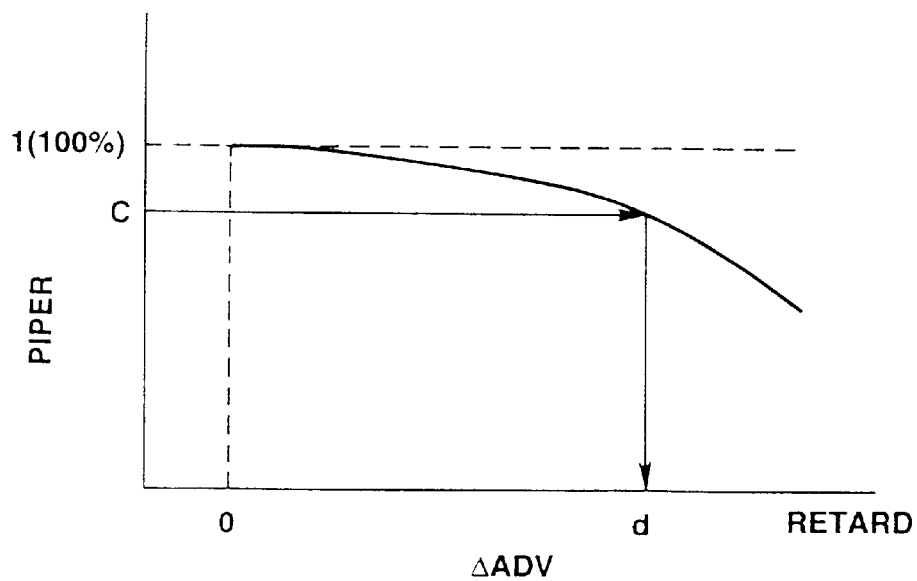
FIG. 5 is a view schematically showing a map used, in the stratified-to-homogeneous combustion changeover control routine of FIG. 3, for conversion from the torque correction factor PIPER to an ignition timing modification quantity ΔADB.

If the difference |dQa−tQa| is equal to or greater than the predetermined value $\epsilon$, the control unit 11 proceeds from the step S8 to a step S9, and calculates an ignition timing modification quantity $\Delta ADV$ in accordance with the torque correction factor PIPER by retrieval from a map as shown in FIG. 5. The ignition timing modification quantity $\Delta ADV$ is an ignition timing retard quantity which increases as the torque correction factor PIPER decreases from 1 (100%). In this example, the control system increases the ignition retard quantity ($\Delta ADV$) as the excess quantity (rQa) increases.

Then, the control unit 11 proceeds to a step S10, waits until an elapse of a predetermined time (10 ms for example) at the step S10. After the elapse of the predetermined time, the control unit 11 returns to the step S4 to repeat the same calculation and the torque correction control until the difference |dQa−tQa| becomes smaller than the predetermined value $\epsilon$.

When the difference |dQa−tQa| becomes smaller than the predetermined value $\epsilon$, the control unit 11 proceeds from the step S8 to a step S11 and reduces the ignition timing modification quantity $\Delta ADV$ to zero to terminate the torque correction control on the assumption that the actual cylinder intake air quantity has approached sufficiently to the target cylinder intake air quantity. Then, the control system terminates the control flow of FIG. 3. In this example, the control system uses the absolute value of the difference between dQa and tQa, as a transient deviation quantity that decreases as the system settles down to the steady state condition after the changeover.

Figure 6:
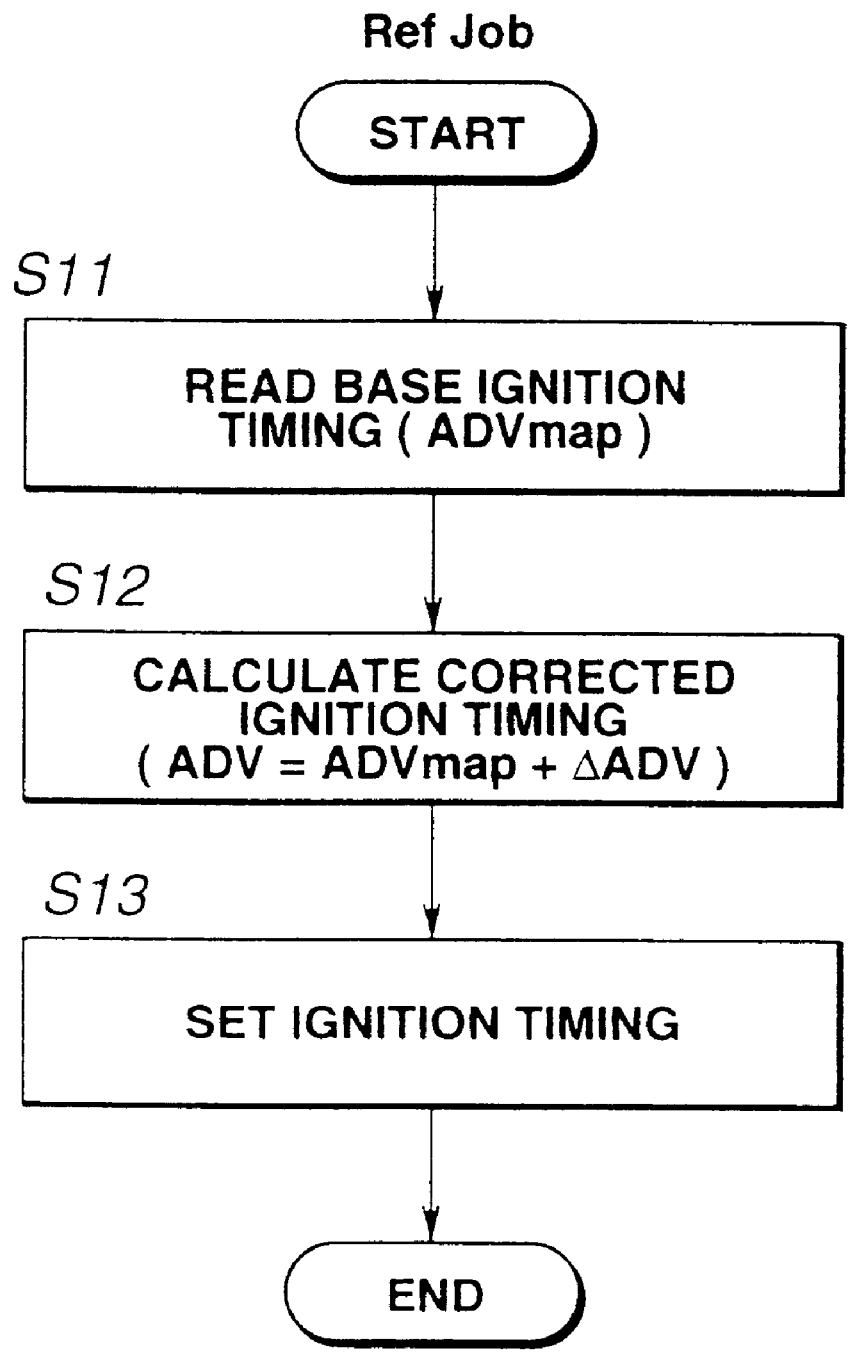
FIG. 6 is a flow chart showing an ignition timing control routine according to the embodiment of the present invention.

FIG. 6 shows an ignition timing control procedure according to this embodiment of the invention.

At a step S11, the control unit 11 determines a base ignition timing ADVB in accordance with the engine operating conditions by retrieval from one or more maps. The control system of this example changes over the base ignition timing ADVB in accordance with a combustion changeover. In the case of the stratified combustion mode, the control system determines the base ignition timing according to an ignition timing control mode adapted to the stratified combustion mode (for example, by using a map for the stratified combustion). In the case of the homogeneous combustion mode, the control system determines the base ignition timing according to an ignition timing control mode adapted to the homogeneous combustion mode (for example, by using a map for the homogeneous combustion).

At a step S12, the control unit 11 determines a corrected (or modified) ignition timing ADV by adding the ignition timing modification quantity $\Delta ADV$ determined at the step S9, to the base ignition timing ADVB. That is, ADV= ADVB+$\Delta ADV$.

At a step S13, the control unit 11 sets the corrected ignition timing ADV as a desired ignition timing, and thereby causes the ignition system to perform a spark ignition according to the setting of the desired ignition timing.

Figure 7:
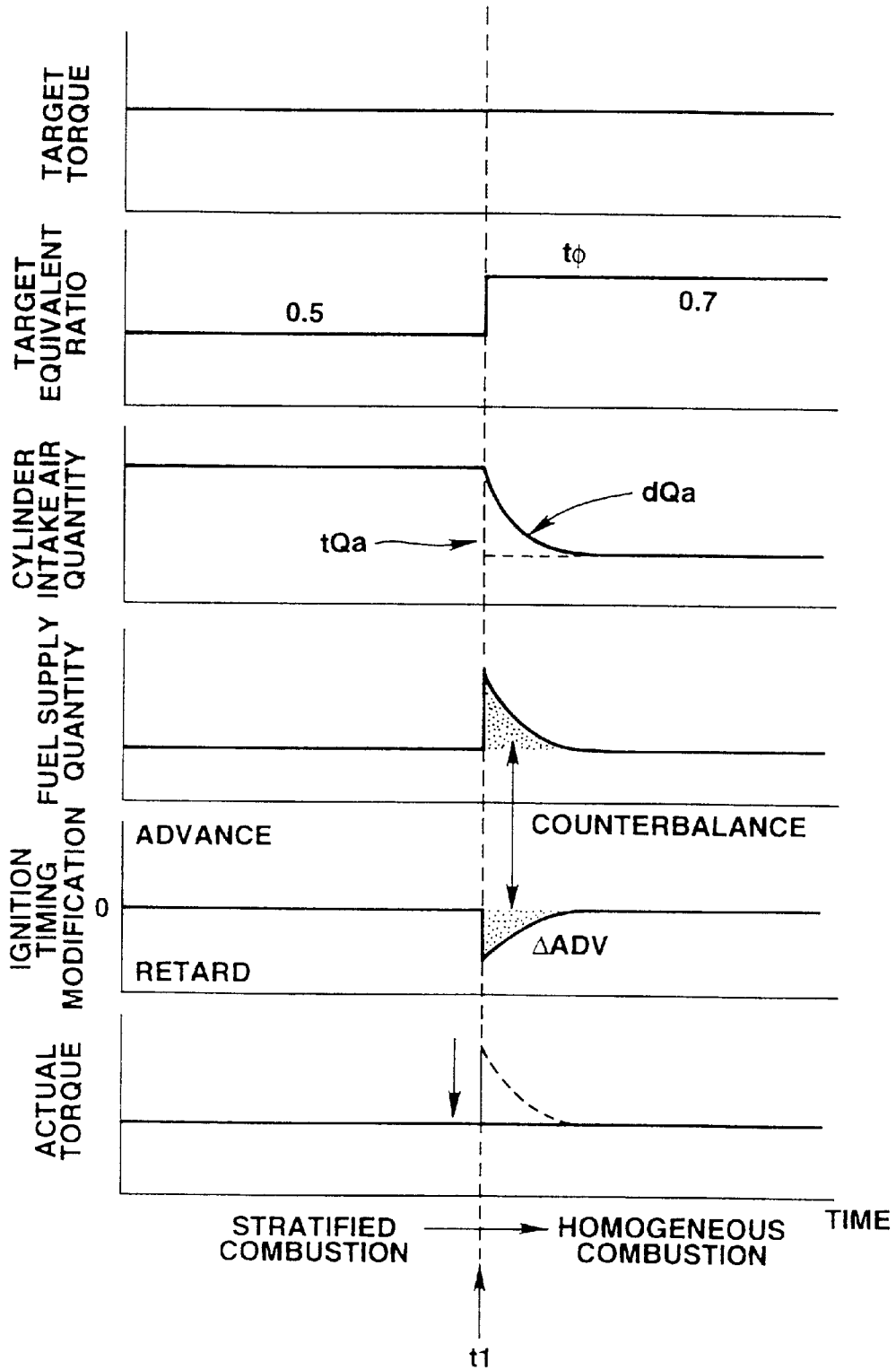
FIG. 7 is a time chart showing variables varying with time to illustrate time dependent events occurring in the control system according to the first practical example of the embodiment in the case of changeover from homogeneous combustion to stratified combustion.

FIG. 7 shows behavior of the control system in the first practical example during a combustion changeover from the stratified combustion mode to the homogeneous combustion mode.

The control unit 11 monitors the engine operating conditions and produces a combustion changeover request signal requesting a combustion changeover from the stratified combustion mode to the homogeneous combustion mode. In response to the stratified-to-homogeneous combustion changeover request signal, the control unit switches the target equivalent ratio t$\phi$ from a first value (of 0.5, for example) for the stratified mode to a second value (of 0.7, for example) for the homogeneous mode.

In relation to the target torque held constant to avoid an unwanted torque difference or torque variation, the stepwise increase of the target equivalent ratio t$\phi$ causes a stepwise decrease of the target cylinder intake air quantity tQa. By contrast to the step decrease of the target cylinder intake air quantity tQa, the delayed cylinder intake air quantity dQa decreases in a gradual manner simulating the actual intake air quantity.

In order to maintain the homogeneous mode target equivalent ratio t$\phi$ (=0.7) in combination with the delayed cylinder intake air quantity dQa, the control system controls the fuel supply quantity so that the fuel supply quantity increases in a stepwise manner immediately after the combustion changeover request, and thereafter the fuel supply quantity decreases gradually.

Therefore, the fuel increase during the lag of the air quantity would cause an increase of the actual torque as shown by a broken line in FIG. 7 though the equivalent ratio is held at the desired value from the changeover.

To prevent such an undesired torque increase, the control system retards the ignition timing by the modification quantity $\Delta ADV$ with respect to the base ignition timing ADVB for the homogeneous mode simultaneously with the combustion changeover. With this ignition retard modification, the control system offsets the undesired torque increase due to the fuel increase, and thereby holds the actual torque constant to achieve the desired smooth target torque.

In the example of FIG. 7, the control system produces the combustion changeover request and simultaneously carries out the changeover at a time t1.

The control system in this practical example of the embodiment can improve the driveability and exhaust emission by realizing a changeover of the actual fuel air ratio to a desired value, without an undesired torque change.

The control system of this example is effective specifically in a changeover from a stratified combustion with an ultra lean air fuel ratio of 30 or more, to a homogeneous stoichiometric combustion of a theoretical air fuel ratio. At idle or in a very low load engine operating region, a homogeneous lean combustion is not appropriate. If, under such a condition, a changeover request from the stratified mode to the homogeneous mode by application of a high load of an air conditioning system of a vehicle, the control system must change the actual combustion mode from the ultra lean stratified mode to the stoichiometric homogeneous mode. In this case, the wide difference between the ultra lean combustion and the stoichiometric combustion causes a very large torque variation as compared to a torque variation in a changeover from a homogeneous lean combustion to a homogeneous stoichiometric combustion. The control system in this practical example can prevent unwanted torque variation even in such a situation.

Figure 8:
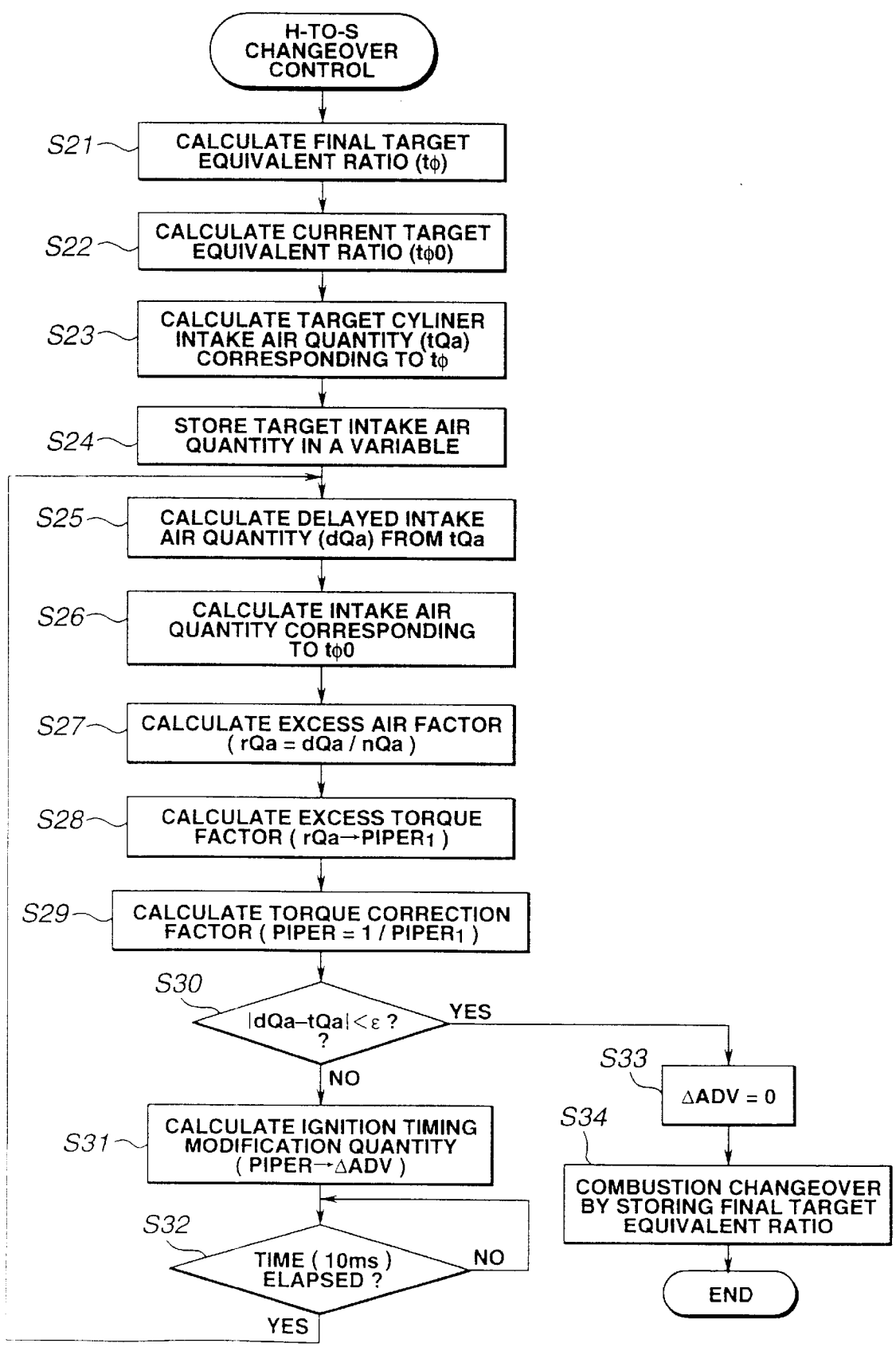
FIG. 8 is a flow chart showing a homogeneous-to-stratified combustion changeover control routine in a second practical example according to the embodiment.

FIG. 8 shows a homogenous-to-stratified combustion changeover control procedure in a second practical example according to the present embodiment. The control system in this example limits the ignition timing in the stratified combustion mode within a very narrow region to ensure satisfactory stratified combustion, and performs the ignition timing modification in the homogeneous mode before the changeover to the stratified mode. Prior to the changeover from the homogeneous combustion mode to the stratified combustion mode, the control system starts the change of the cylinder intake air quantity to the target value of the stratified mode, and controls the fuel supply quantity during the lag of the actual air quantity to the target. During this, the control system modifies the ignition timing to prevent torque from being increased by an increase of the fuel supply quantity. When the intake air quantity has reached the target, the control system carries out a changeover of the actual combustion by changing the ignition timing to the timing for the stratified mode.

The combustion changeover control procedure of FIG. 8 is performed by the control system shown in FIG. 2. The control unit 11 executes the routine of FIG. 8 when a combustion changeover from the homogeneous combustion mode to the stratified combustion mode is requested in accordance with the current engine operating conditions.

At a step S21, the control unit 11 calculates an final target equivalent ratio t$\phi$ for use after a changeover to the stratified combustion mode, in accordance with the current engine operating conditions (the engine speed and load).

At a step S22, the control unit 11 calculates a current target equivalent ratio t$\phi$0 for the homogeneous combustion mode, in accordance with the current engine operating conditions (the engine speed and load).

At a step S23, the control unit 11 calculates a target cylinder intake air quantity tQa corresponding to the final target equivalent ratio t$\phi$.

At a step S24, the control unit 11 stores the target cylinder intake air quantity tQa in the predetermined variable. This control system controls the intake air quantity by another job.

At a step S25, the control unit 11 calculates a delayed cylinder intake air quantity dQa from the target cylinder intake air quantity tQa in the same manner as in the step S4 of FIG. 3.

At a step S26, the control unit 11 calculates a current target cylinder intake air quantity nQa corresponding to the current target equivalent ratio t$\phi$0 for the homogeneous mode.

At a step S27, the control unit 11 calculates an excess air factor rQa of the delayed cylinder intake air quantity dQa with respect to the current target cylinder air quantity nQa (that is, rQa=dQa/nQa).

At a step S28, the control unit 11 calculates an excess torque factor PIPER1 from the excess air factor rQa, by information retrieval from the map as shown in FIG. 4. The excess torque factor PIPER1 obtained by the step S28 is an excess factor of the torque obtained by the current target equivalent ratio t$\phi$0 and the delayed cylinder intake air quantity dQa representing the actual cylinder intake air quantity, with respect to the homogenous mode target torque obtained by the target equivalent ratio t$\phi$0 and the current target cylinder intake air quantity nQa of the homogeneous mode. In other words, the excess torque factor PIPER1 represents a factor or rate by which the actual torque (obtained without the ignition timing control) increased by an increase in the intake air quantity exceeds the homogeneous mode target torque.

At a step S29, the control unit 11 calculates a torque correction factor PIPER from the excess torque factor PIPER1 (PIPER=1/PIPER1).

At a step S30, the control unit 11 checks whether a difference (or deviation) |dQa−tQa| between the delayed cylinder intake air quantity dQa and the final target cylinder intake air quantity tQa for the stratified mode is smaller than a predetermined value $\epsilon$.

If the difference |dQa−tQa| is equal to or greater than the predetermined value $\epsilon$, the control unit 11 proceeds to a step S31, and calculates an ignition timing modification quantity $\Delta$ADV in accordance with the torque correction factor PIPER by retrieval from the map as shown in FIG. 5.

Then, the control unit 11 proceeds to a step S32, waits for an elapse of a predetermined time (10 ms for example) at the step S32, and then returns to the step S25 to repeat the same calculation and the torque correction control until the difference |dQa−tQa| becomes smaller than the predetermined value $\epsilon$.

When the difference |dQa−tQa| becomes smaller than the predetermined value $\epsilon$, the control unit 11 proceeds from the step S30 to a step S33 and reduces the ignition timing modification quantity $\Delta$ADV to zero to terminate the torque correction control on the assumption that the actual cylinder intake air quantity has approached sufficiently to the target cylinder intake air quantity for the stratified mode. Then, at a step S34, the control system performs a changeover of the combustion to the stratified mode by storing the final target equivalent ratio t$\phi$ in the predetermined variable. The control of the equivalent ratio is performed by another job. Then, the control unit 11 terminates the control flow of FIG. 8.

Figure 9:
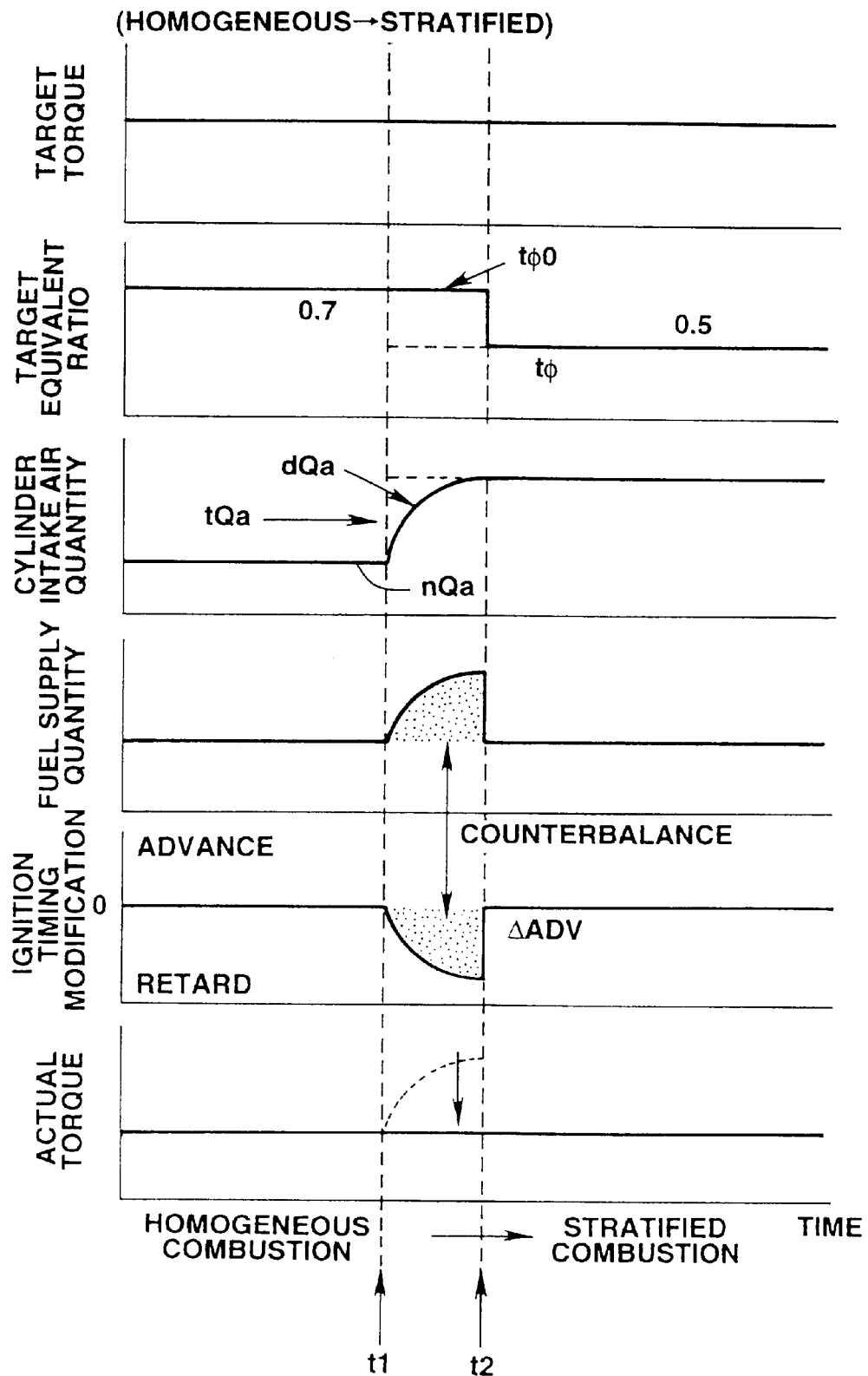
FIG. 9 is a time chart showing variables varying with time to illustrate time dependent events occurring in the control system according to the control routine of FIG. 8 in the case of changeover from homogeneous combustion to stratified combustion.

FIG. 9 shows behavior of the control system in the second practical example during a combustion changeover from the homogeneous combustion mode to the stratified combustion mode.

By monitoring the engine operating conditions, the control unit 11 produces an H-to-S combustion changeover request signal requesting a combustion changeover from the homogeneous combustion mode to the stratified combustion mode. In response to the H-to-S combustion changeover request signal, the control unit calculates the final target equivalent ratio t$\phi$ (0.5, for example) for the imminent stratified mode. However, the control unit 11 holds the actual target equivalent ratio t$\phi$ equal to a value (0.7, for example) for the homogeneous mode, and increases the intake air quantity to the stratified mode target quantity tQa. In response to this, the actual intake air quantity increases gradually, and the delayed intake air quantity dQa increases in a similar manner.

In accordance with the gradual increase of the delayed intake air quantity dQa, the control system increases the fuel supply quantity gradually so as to achieve the homogeneous mode target equivalent ratio t$\phi$0.

To cancel an increase of the actual torque as shown by a broken line in FIG. 9 caused by the fuel increase, the control system retards the ignition timing by the amount of the ignition timing modification quantity $\Delta$ADV with respect to the base ignition timing ADVB of the homogeneous mode. The control system can hold the actual torque constant or smooth by countervailing a torque increase caused by the fuel increase with a torque decrease by the ignition modification.

When the intake air quantity reaches the stratified mode target quantity tQa, the control system switches the desired equivalent ratio to the desired ratio for the stratified mode. In response to this change to the stratified mode desired equivalent ratio, the fuel supply quantity is decreased stepwise. At the same time, the control system switches the ignition timing to the stratified mode timing. Thus, the control system can change over the combustion while holding the torque constant.

In the example of FIG. 9, the control system produces the changeover request at a time t1 and then carries out the changeover at a time t2.

In the second practical example, the control system increases the intake air quantity and the fuel supply quantity by maintaining the homogeneous mode target equivalent ratio before the changeover of the combustion. During this, the control system prevents unwanted torque variation with the ignition timing modification. By so doing, the control system can improve the driveability and emission performance of the engine. The control system performs the ignition timing modification in the homogeneous combustion and thereby eliminates unwanted torque increase in a combustion changeover without deteriorating the stratified combustion.

Figure 10:
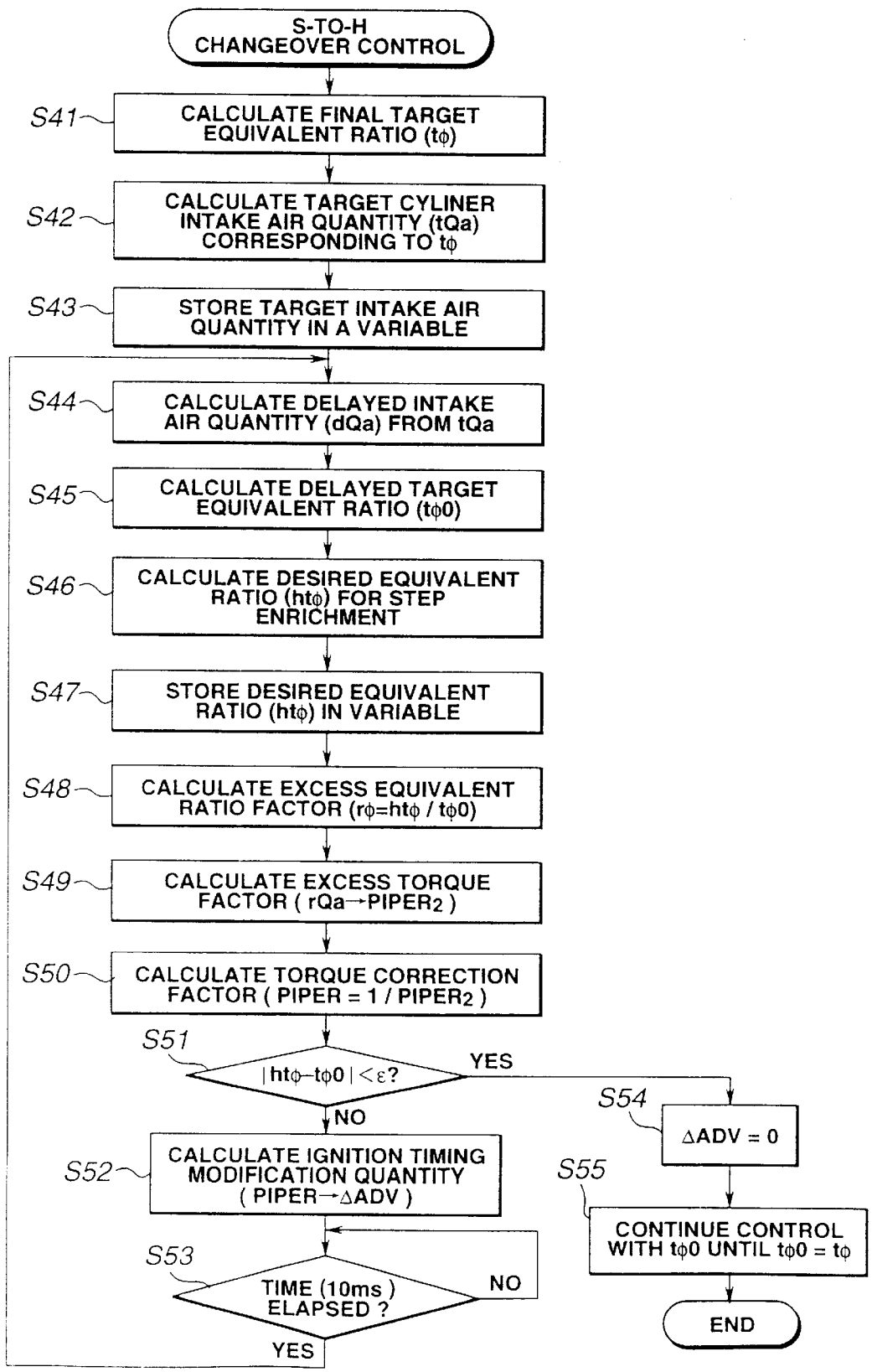
FIG. 10 is a flow chart showing a stratified-to-homogeneous combustion changeover control routine in a third practical example according to the embodiment of the present invention.

FIG. 10 shows a stratified-to-homogeneous combustion control procedure in a third practical example in which a residual EGR gas quantity is taken into account.

In this example, the control system increases the EGR quantity to reduce NOx in the ultra lean stratified combustion mode, and decreases the EGR quantity in the homogeneous mode. Specifically, in the homogeneous lean combustion near the lean limit of the air fuel ratio, the control system of this example interrupts the EGR to protect the combustion from being made poor by the EGR gas. In the changeover of the combustion from the stratified mode to the homogeneous mode, the EGR gas in a large amount used in the stratified mode tends to remain after the changeover to the homogeneous mode, and the residual EGR gas can be a detrimental factor deteriorating the characteristic of the combustion and causing a torque decrease.

The control system of the third practical example is designed to increase the target equivalent ratio to enrich the air fuel mixture in a transient state and thereby to protect the combustion against adverse influence of a transient condition such as the residual EGR gas. Furthermore, the control system cancels the a torque increase by the increase of the target equivalent ratio with ignition timing modification.

In the process of FIG. 10, the control unit 11 calculates the final target equivalent ratio tφ for use after a changeover to the homogeneous combustion mode at a step S41 like the step S1 of FIG. 3, further calculates the target cylinder intake air quantity tQa corresponding to the target equivalent ratio tφ at a step S42 like the step S2, and then carries out a combustion changeover by storing the target cylinder intake air quantity tQa in a predetermined variable at a step S43 corresponding to the step S3. Then, at a step S44 like the step S4, the control unit 11 calculates the delayed cylinder intake air quantity dQa representing the actual intake air quantity.

At a step S45, the control unit 11 calculates a delayed target equivalent ratio tφ0 which varies in phase with the delayed cylinder intake air quantity dQa. It is optional to determine the delayed target equivalent ratio by using a predetermined function (such as predetermined step response, ramp response or n-order curve) representing a curve smoothly extending from the equivalent ratio at the changeover to the final target equivalent ratio.

At a step S46, the control unit 11 calculates a desired target equivalent ratio htφ of a relatively great magnitude, designed to avoid adverse influence of the residual EGR gas with stepwise enrichment.

At a step S47, the control unit 11 stores the desired equivalent ratio htφ in a predetermined variable to carry out an equivalent ratio control. The control system of this example carries out the equivalent ration control by another job.

At a step S48, the control unit 11 calculates an excess equivalent ratio factor rφ of the desired equivalent ratio htφ to the delayed target equivalent ratio tφ0). That is, rφ=htφ/tφ0.

Figure 11:
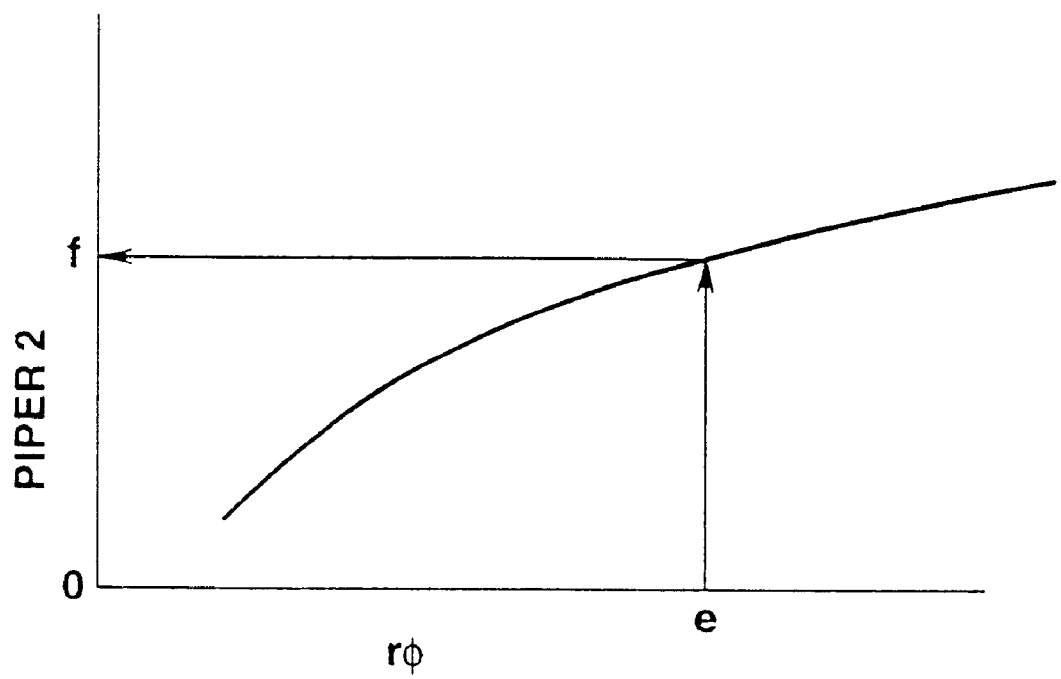
FIG. 11 is a view schematically showing a map, used in the routine of FIG. 10, for conversion from equivalent ratio factor rφ to excess torque factor PIPER2.

At a step S49, the control unit 11 calculates an excess torque factor PIPER2 from the excess ratio factor rφ, by information retrieval from a map as shown in FIG. 11. The excess torque factor PIPER2 increases as the ratio rφ increases as shown in FIG. 11. The excess torque factor PIPER2 is an excess factor of the torque obtained by the desired target equivalent ratio htφ, with respect to the torque obtained by the delayed target equivalent ratio tφ0. The torque obtained by the delayed target equivalent ratio tφ0 is calculated as a value excluding influence of torque-down due to the residual EGR gas. The influence of the residual EGR gas is eliminated by the use of the desired equivalent ratio htφ, and accordingly the control unit 11 thus determines the torque ratio purely from the ratio of the equivalent ratios.

At a step S50, the control unit 11 calculates a torque correction factor PIPER from the excess torque factor PIPER2. In this example, the torque correction factor PIPER is the reciprocal of the excess torque factor PIPER1. That is, PIPER=1/PIPER2.

At a step S51, the control unit 11 checks whether a difference (or deviation) |htφ-tφ0| between the desired equivalent ratio htφ and the delayed target equivalent ratio tφ0 is smaller than a predetermined value ε.

If the difference |htφ-tφ0| is equal to or greater than the predetermined value ε, the control unit 11 proceeds from the step S51 to a step S52, and calculates an ignition timing modification quantity ΔADV in accordance with the torque correction factor PIPER like the step S9 of FIG. 3.

Then, the control unit 11 proceeds to a step S53, waits for an elapse of a predetermined time (10 ms for example) at the step S53, and then returns to the step S44 to repeat the same calculation and the torque correction control until the difference |htφ-tφ0| becomes smaller than the predetermined value ε.

When the difference |htφ-tφ0| becomes smaller than the predetermined value ε, the control unit 11 judges that the residual EGR gas quantity has decreased to a sufficiently small level free from the possibility of deterioration of combustion, and proceeds to a step S54. At the step S54, the control unit 11 reduces the ignition timing modification quantity ΔADV to zero to terminate the torque correction control. Then, at a step S55, the control system continues the control of the fuel supply quantity with the delayed target equivalent ratio tφ0 until the delayed target equivalent ratio reaches the final target equivalent ratio tφ. After the final target equivalent ratio is reached, the control unit 11 controls the fuel supply quantity according to the final target equivalent ratio tφ.

Figure 13:
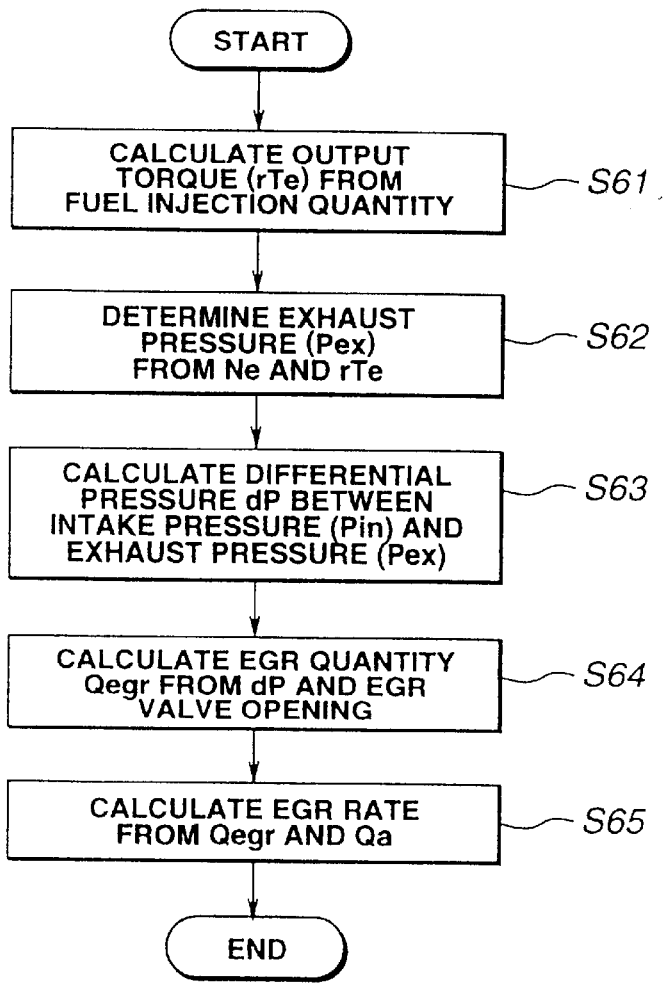
FIG. 13 is a flow chart showing an EGR rate calculating routine used in the third practical example according to the embodiment.

FIG. 13 shows behavior of the control system in the third practical example during a combustion changeover from the stratified combustion mode to the homogeneous combustion mode.

Figure 12:
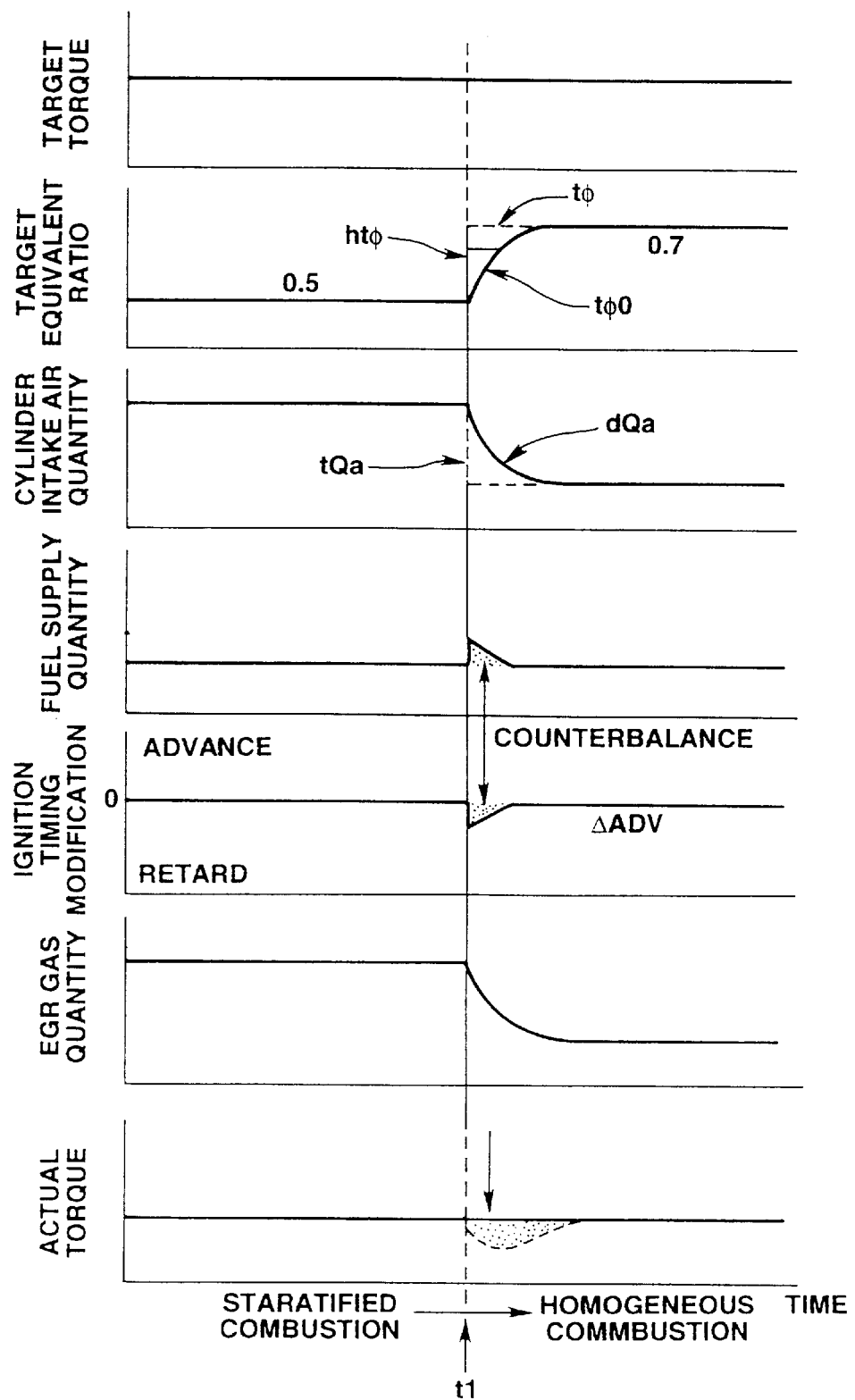
FIG. 12 is a time chart showing variables varying with time to illustrate time dependent events occurring according to the control routine of FIG. 10 in the case of changeover from stratified combustion to homogeneous combustion.

In response to a stratified-to-homogeneous combustion changeover request signal produced in accordance with the engine operating conditions, the control system switches the target equivalent ratio tφ to a value for the homogeneous mode, correspondingly switches the desired target intake air quantity to a decreased value corresponding to the target equivalent ratio for the homogeneous mode, and computes the delayed target equivalent ratio tφ0 corresponding to the delayed target air quantity dQa. In this example, the control system increases the target equivalent ratio stepwise to the desired equivalent ratio htφ to enrich the air fuel mixture and thereby to avoid undesired influence of the residual EGR gas in a transient state after the changeover from the stratified combustion to the homogeneous combustion. This stepwise increase of the equivalent ratio causes an increase in the fuel supply quantity as shown in FIG. 12. However, the control system retards the ignition timing by the modification quantity ΔADV, and thereby prevents the torque from being increased by the fuel increase. After the delayed target equivalent ratio tφ0 has reached the desired target equivalent ratio htφ, the control system controls the actual equivalent ratio according to the delayed target equivalent ratio tφ0 until the final target equivalent ratio tφ is reached.

The control system in this practical example of the embodiment can avoid adverse influence of the residual EGR gas without torque fluctuation, and thereby improve the driveability and exhaust emission.

It is possible to employ a fixed value as the desired equivalent ratio htφ. In this case, the desired equivalent ratio htφ is set at a predetermined rich level to safely avoid the adverse influence of the residual EGR gas. In the example of FIG. 12, the desired equivalent ratio htφ is intermediate between the target equivalent ratio for the stratified mode and the final target equivalent ratio for the homogeneous mode.

Alternatively, the control system can estimate a residual EGR gas quantity and varies the desired equivalent ratio htφ in accordance with the estimated residual EGR gas quantity. For example, the residual EGR quantity can be estimated from the EGR rate at the time of the stratified combustion.

Figure 14:
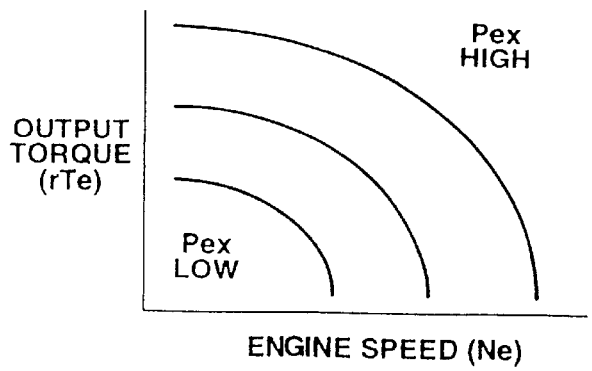
FIG. 14 is a view schematically showing an exhaust pressure map used in the routine of FIG. 13.

FIG. 14 shows, as an example, a routine for estimating the EGR rate.

At a step S61, the control unit 11 calculates an output torque rTe from the fuel injection quantity.

At a step S62, the control unit 11 calculates an exhaust gas pressure Pex in accordance with the engine speed Ne and the output torque rTe, by retrieval from a map as shown in FIG. 14, for example.

At a step S63, the control unit 11 calculates a differential pressure dP between the exhaust gas pressure Pex and an intake gas pressure Pin. The control unit 11 can determine the intake pressure Pin by using a sensed pressure of an intake pressure sensor such as an intake manifold pressure sensor, or a pressure estimated from the throttle valve opening degree TVO and the engine speed Ne.

Then, the control unit 11 calculates, at a step S64, an EGR quantity Qegr from the differential pressure dP and the opening degree of the EGR valve disposed in the EGR passage 14, and further calculates an EGR rate from the EGR quantity Qegr and the intake air quantity Qa.

By using the thus-calculated EGR rate, the control unit 11 can estimate the quantity of the residual EGR gas remaining after the changeover to the homogeneous combustion, and determine an adequate value of the desired equivalent ratio htφ in accordance with the estimated residual EGR gas quantity, for example, through the calculation of the ratio of the target equivalent ratios.

In these practical examples, the control system is arranged to determine the ignition timing modification quantity in accordance with a ratio between first and second parameters. The first and second parameters may be the target cylinder intake air quantity and the current intake air quantity, or may be the first and second equivalent ratios. However, it is possible to employ the difference between the first and second parameters, instead of the ratio. In either case, the control system can readily determine the ignition timing modification quantity from a single parameter (ratio or difference) by using a two dimensional map.

In the embodiment, the control system may be arranged to effect a changeover of the combustion mode of the engine from the stratified charge combustion mode to the homogeneous charge combustion mode by changing the desired fuel air ratio signal from a stratified mode desired ratio determined according to the stratified mode to a homogenous mode desired ratio determined according to the homogenous mode in a manner to prevent an unwanted torque variation due to a difference in combustion efficiency between the stratified combustion mode and the homogeneous combustion mode. In this case, the control system in the third example can determine the desired equivalent ratio (htφ) in consideration of the difference in the combustion efficiency between the stratified mode and the homogeneous mode.

In the illustrated embodiment of the invention, the fuel supply quantity is determined in accordance with the desired equivalent ratio (or desired fuel/air ratio) and the current intake air quantity. The current intake air quantity may be a quantity determined from the sensed intake air quantity sensed by the air flow sensor 3, in consideration of a predetermined lag, or the delayed cylinder intake air quantity dQa may be used as the current intake air quantity, for determining the fuel supply quantity.

This application is based on a Japanese Patent Application No. 9-182290. The contents of the Japanese Patent Application No. 9-182290 with a filing date of Jul. 8, 1997 in Japan are hereby incorporated by reference.

What is claimed is:

1. An internal combustion engine comprising:
    an actuating system for changing over an actual combustion mode of the engine; and
    a controller for modifying an ignition timing of the engine to compensate for a torque variation due to a variation of a fuel supply quantity in a changeover of the combustion mode,
    wherein the controller comprises first means for estimating the torque variation due to the variation of the fuel supply quantity in the changeover of the combustion mode, second means for determining an ignition timing modification quantity to eliminate the torque variation estimated by the first means, and third means for varying the ignition timing of the engine by the ignition timing modification quantity.

2. An actuating system for changing over an actual combustion mode of the engine; and
    a controller for modifying an ignition timing of the engine to compensate for a torque variation due to a variation of a fuel supply quantity in a changeover of the combustion mode,
    wherein the actuating system is arranged to change over the actual combustion mode of the engine between a stratified charge combustion mode and a homogeneous charge combustion mode by controlling the fuel supply quantity and an intake air quantity to the engine, and the controller is adapted to control the actuating system to carry out a changeover of the actual combustion mode between the stratified combustion mode and the homogeneous combustion mode by varying the intake air quantity and the fuel supply quantity in a state of the homogeneous mode, and to modify the ignition timing of the engine to cancel the torque variation due to the variation of the fuel supply quantity in the state of the homogeneous mode during the changeover of the combustion mode.

3. The internal combustion engine according to claim 3 wherein the controller is adapted to carry out the changeover of the actual combustion mode between the stratified mode and the homogeneous mode by varying the intake air quantity and the fuel supply quantity and modifying the ignition timing before the changeover of the combustion mode when the changeover is from the homogeneous mode to the stratified combustion mode, and by varying the intake air quantity and the fuel supply quantity and modifying the ignition timing after the changeover of the combustion mode when the changeover is from the stratified mode to the homogeneous mode.

4. An internal combustion engine comprising:
an actuating system for changing over an actual combustion mode of the engine; and
a controller for modifying an ignition timing of the engine to compensate for a torque variation due to a variation of a fuel supply quantity in a changeover of the combustion mode,
wherein the controller is adapted to command the actuating system to change over the combustion mode of the engine by changing a desired fuel air ratio and a desired cylinder intake air quantity in a stepwise manner, and to modify the ignition timing to cancel the torque variation due to the variation of the fuel supply quantity, wherein the ignition timing is modified during a lag from a change in the desired cylinder intake air quantity to a resulting change in an actual intake air quantity to the engine.

5. The internal combustion engine according to claim 1 wherein the controller is configured to command the actuating system to change over the combustion mode of the engine from a first combustion mode to a second combustion mode by producing a stepwise change in a desired fuel air ratio and varying an actual cylinder intake air quantity to the engine to a desired quantity for the second combustion mode prior to the stepwise change of the desired fuel air ratio, and to modify the ignition timing to cancel the torque variation due to the variation of the fuel supply quantity during a lag of the actual cylinder intake air quantity before the stepwise change of the desired fuel air ratio.

6. An internal combustion engine comprising:
an actuating system for changing over an actual combustion mode of the engine; and
a controller for modifying an ignition timing of the engine to compensate for a torque variation due to a variation of a fuel supply quantity in a changeover of the combustion mode,
wherein the controller is adapted to control an actual fuel air ratio of an air fuel mixture produced in the engine with the actuating system by producing a desired fuel air ratio signal, to change a magnitude of the desired fuel air ratio control signal from a first desired ratio to a second desired ratio in a changeover of the combustion mode of the engine, and to modify the ignition timing to cancel the torque variation due to the variation of the fuel supply quantity caused by a difference between a value of the fuel supply quantity determined by the first ratio and a value of the fuel supply quantity determined by the second ratio.

7. The internal combustion engine according to claim 6 wherein the controller is adapted to command the actuating system to change over the combustion mode of the engine from a stratified charge combustion mode to a homogeneous charge combustion mode by varying the desired fuel air ratio signal, to change the desired fuel air ratio signal from the first desired ratio to the second desired ratio greater than the first desired ratio to prevent instability of combustion in a predetermined transient state after the changeover from the stratified combustion mode to the homogeneous combustion mode, and to modify the ignition timing to cancel the torque variation due to the variation of the fuel supply caused by a change of the desired fuel air ratio signal from the first desired ratio to the second desired ratio in the transient state remaining after the changeover to the homogeneous mode.

8. The internal combustion engine according to claim 7 wherein the controller is adapted to increase the desired fuel air ratio signal from the first desired ratio to the second desired ratio to prevent the actual fuel air ratio to enter a predetermined forbidden region in the predetermined transient state after the changeover from the stratified mode to the homogeneous mode.

9. The internal combustion engine according to claim 7 wherein the controller is adapted to determine an estimated residual EGR quantity representing an amount of an EGR gas remaining after the changeover from the stratified mode to the homogeneous mode, to determine a ratio modification factor in accordance with the estimated residual EGR quantity and to further determine the second desired ratio in accordance with the ratio modification factor.

10. The internal combustion engine according to claim 7 wherein the controller is adapted to effect a changeover of the combustion mode of the engine from the stratified charge combustion mode to the homogeneous charge combustion mode by changing the desired fuel air ratio signal from a stratified mode desired ratio determined according to the stratified mode to a homogenous mode desired ratio determined according to the homogenous mode in a manner to prevent an unwanted torque variation due to a difference in combustion efficiency between the stratified combustion mode and the homogeneous combustion mode, to determine the second desired ratio in consideration of the difference in the combustion efficiency between the stratified mode and the homogeneous mode, to set the homogeneous mode desired ratio equal to the second desired ratio if the predetermined transient state exists after the changeover from the stratified combustion mode to the homogeneous combustion mode.

11. The internal combustion engine according to claim 7 wherein the first desired ratio that is a delayed fuel air ratio, and the controller is adapted to calculate the delayed fuel air ratio designed to vary in phase with an actual intake air quantity to the engine in a changeover from the stratified combustion mode to the homogeneous combustion mode.

12. The internal combustion engine according to claim 7 wherein the controller is adapted to vary the first desired ratio from an initial value to a final value in a changeover from the stratified mode to the homogeneous mode, and the first desired ratio is a predetermined function varying gradually with time from the initial value to the final value.

13. An internal combustion engine comprising:
an actuating system for changing over an actual combustion mode of the engine; and
a controller for modifying an ignition timing of the engine to compensate for a torque variation due to a variation of a fuel supply quantity in a changeover of the combustion mode,
wherein the controller is adapted to compute an ignition timing modification quantity in accordance with an excess quantity that is a predetermined function of first and second control parameters, and to retard the ignition timing by the ignition timing modification quantity.

14. The internal combustion engine according to claim 13 wherein the first control parameter is a variable representing a desired intake air quantity and the second control parameter is a variable representing an actual intake air quantity to the engine.

15. The internal combustion engine according to claim 13 wherein the first and second control parameters are first and second desired fuel air ratios, respectively.

16. The internal combustion engine according to claim 13 wherein the excess quantity is one of a ratio and a difference between the first and second control parameters.

17. An internal combustion engine comprising:
an actuating system for changing over an actual combustion mode of the engine; and
a controller for modifying an ignition timing of the engine to compensate for a torque variation due to a variation of a fuel supply quantity in a changeover of the combustion mode,
wherein the actuating system is constructed to increase the fuel supply quantity by a fuel increase quantity, and retard the ignition timing by an ignition retard quantity during a changeover of the combustion mode of the engine, and the controller is adapted to increase the ignition retard quantity and the fuel increase quantity transiently in a synchronous manner to produce equal torque variations counterbalancing with each other, in the transition of the actual combustion mode from one of first and second combustion modes to the other of the first and second combustion modes.

18. An internal combustion engine comprising:
an actuating system for changing over an actual combustion mode of the engine; and
a controller for modifying an ignition timing of the engine to compensate for a torque variation due to a variation of a fuel supply quantity in a changeover of the combustion mode,
wherein the actuating system comprises a first actuating system for effecting a changeover of an actual fuel air ratio of an air fuel mixture produced in the engine from a first ratio level suitable for a first combustion mode to a second ratio level suitable for a second combustion mode by controlling an actual intake air quantity of intake air supplied to the engine in response to an air control signal and an actual fuel quantity of fuel supplied to the engine in respect to a fuel control signal, and a second actuating system for controlling the ignition timing of the engine in response to an ignition control signal,
wherein the internal combustion engine further comprises a sensor for collecting input information by sensing an engine operating condition of the engine, and the controller produces a combustion changeover request signal in accordance with the input information, and
wherein the controller is adapted to produce the air control signal, the fuel control signal and the ignition control signal in accordance with the input information collected by the sensor, to change the air control signal from a first air quantity level to a second air quantity level to cause the first actuating system to carry out the changeover of the actual fuel air ratio from the first ratio level to the second ratio level in response to the changeover request signal, and to modify the ignition timing to prevent an output torque of the engine from being varied by a variation of the actual fuel quantity during a time lag from a change of the air control signal from the first air quantity level to the second air quantity level to a resulting change in the actual air quantity to the engine.

19. The internal combustion engine according to claim 18 wherein the controller is adapted to produce a desired fuel air ratio signal representing a desired fuel air ratio to produce the air control signal and the fuel control signal in accordance with the desired fuel air ratio signal to achieve the desired fuel air ratio, and to perform the changeover of the actual fuel air ratio from the first ratio level to the second ratio level in response to the changeover request signal by carrying out a changeover of the desired fuel air ratio signal from the first ratio level to the second ratio level, and a changeover of the air control signal from the first air quantity level to the second air quantity level in response to the changeover request signal.

20. The internal combustion engine according to claim 19 wherein the controller is adapted to varying a predetermined delayed variable in a gradual manner simulating a gradual variation of the actual air quantity, to start a gradual variation of the delayed variable in response to the changeover of the air control signal from the first air quantity level to the second air quantity level, to determine an excess quantity representing an excess torque in accordance with the delayed variable, to further determine an ignition timing modification quantity in accordance with the excess quantity, and to modify the ignition timing by modifying the ignition control signal in accordance with the ignition timing modification quantity.

21. The internal combustion engine according to claim 20 wherein the excess quantity is an amount by which a first control parameter exceeds a second control parameter, one of the first and second control parameters being the delayed variable, and the other of the first and second control parameters being a magnitude of one of the air control signal and the desired fuel air ratio signal.

22. The internal combustion engine according to claim 21 wherein the controller terminates a modification of the ignition timing by the ignition timing modification quantity when a transient produced by the changeover of the air control signal decreases.

23. The internal combustion engine according to claim 22 wherein the controller determines a deviation of the delayed variable from a predetermined target magnitude, and terminates the modification of the ignition timing by the ignition timing modification quantity when the deviation representing the transient becomes smaller than a predetermined value.

24. The internal combustion engine according to claim 21 wherein the excess quantity is proportional to one of a ratio of the first control parameter to the second control parameter and a difference of the first control parameter from the second control parameter, and wherein the controller produces the actual air quantity signal in accordance with one of the air control signal and the input information.

25. The internal combustion engine according to claim 21 wherein the controller produces an actual air quantity signal representing the actual intake air quantity supplied to the engine, and varying gradually from the first air quantity level to the second air quantity level in response to a step change of the air control signal from the first air quantity level to the second air quantity level, and produces the fuel control signal in accordance with the actual air quantity signal and the desired fuel air ratio signal, and wherein one of the first and second modes is a stratified charge combustion mode and the other of the first and second modes is a homogeneous charge combustion mode.

26. The internal combustion engine according to claim 25 wherein the controller is configured to change the desired fuel air ratio signal in a stepwise manner from the first ratio level to the second ratio level and the air control signal in a stepwise manner from the first air quantity level to the second air quantity level in response to the changeover request signal, to set the first control parameter equal to a most recent magnitude of the actual air quantity signal and the second control parameter equal to a most recent magnitude of the air control signal in the homogeneous mode, and use the actual air quantity signal as the delayed variable.

27. The internal combustion engine according to claim 26 wherein the first mode is the stratified combustion mode and the second mode is the homogeneous combustion mode, and wherein the controller effects an increase of the desired fuel air ratio from the first ratio level to the second ratio level and a decrease of the air control signal from the first air quantity level to the second air quantity level simultaneously in response to the changeover request signal.

28. The internal combustion engine according to claim 26 wherein the first mode is the homogeneous combustion mode and the second mode is the stratified combustion mode, and wherein the controller effects an increase of the air control signal from the first air quantity level to the second air quantity level immediately in response to the changeover request signal, and delays a decrease of the desired fuel air ratio from the first ratio level to the second ratio level.

29. The internal combustion engine according to claim 22 wherein the controller is adapted to produce a step change of a target fuel air ratio from the first ratio level to the second ratio level in response to the changeover request signal, varies a delayed fuel air ratio gradually from the first ratio level to the second ratio level in response to the step change of the target fuel air ratio, and increases the desired fuel air ratio over the delayed fuel air ratio during a gradual variation of the delay fuel air ratio from the first ratio level to the second ratio level, and the controller is configured to set the first control parameter equal to the desired fuel air ratio and the second control parameter equal to the delayed fuel air ratio as the delayed variable.

30. The internal combustion engine according to claim 29 wherein the actuating system further comprises an EGR system for performing exhaust gas recirculation in a stratified charge combustion mode in response to an EGR control signal produced by the controller, and the controller is configured to make the desired fuel air ratio greater than the delayed fuel air ratio after a changeover of the target fuel air ratio from the first ratio level for the stratified mode to the second ratio level for a homogeneous charge combustion mode, to prevent undesired influence on a stability of combustion in the engine by a residual EGR gas remaining after the changeover of the actual combustion mode to the homogeneous mode.

31. The internal combustion engine according to claim 30 wherein the controller is adapted to change the desired fuel air ratio to a value outside a predetermined forbidden region after a changeover of the target fuel air ratio from the first ratio level for the stratified mode to the second ratio level for the homogeneous mode.

32. The internal combustion engine according to claim 30 wherein the controller determines an estimated residual EGR quantity, determines an enrichment quantity in accordance with the estimated residual EGR quantity, and increases the desired fuel air ratio above the delayed fuel air ratio in accordance with the enrichment quantity.

33. The internal combustion engine according to claim 12 wherein the fuel system comprises a fuel injector for injecting fuel directly into an engine cylinder of the engine; wherein the controller comprises a computer system comprising at least one central processing unit; and wherein the sensor comprises at least one of an engine load sensor for sensing an engine operating condition indicative of an engine load, and an engine speed sensor for sensing an engine operating condition indicative of an engine speed.

34. An engine control process for an internal combustion engine, comprising:
  changing over an actual combustion condition of the engine; and
  modifying an ignition timing of the engine to compensate for a torque variation due to a variation of a fuel supply quantity in a changeover of the combustion mode,
  wherein the control process further comprises determining a predetermined delayed variable varying in a gradual manner simulating a gradual variation of an actual intake air quantity to the engine in the changeover of the combustion condition, and further determining an excess quantity representing an excess torque in accordance with the delayed variable, and modifying the ignition timing further includes determining an ignition timing modification quantity in accordance with the excess quantity, and modifying the ignition timing in accordance with the ignition timing modification quantity.

35. The engine control process according to claim 34 wherein changing over an actual combustion condition of the engine comprises, first, producing a desired fuel air ratio signal representing a desired fuel air ratio in response to a changeover request signal produced in accordance with a sensed engine operating condition to initiate a changeover of the combustion condition, second, producing an air control signal to control an actual intake air quantity to the engine in accordance with the desired fuel air ratio signal to achieve the desired fuel air ratio, and third, performing a changeover of an actual fuel air ratio of the engine from a first ratio level to a second ratio level in response to the changeover request signal by carrying out a changeover of the desired fuel air ratio signal from the first ratio level to the second ratio level, and a changeover of the air control signal from a first air quantity level to a second air quantity level in response to the changeover request signal.

36. The engine control process according to claim 35 wherein modifying the ignition timing further comprises monitoring a transient condition after the changeover of the air control signal from the first air quantity level to the second air quantity level, and reducing the ignition timing modification quantity to zero to terminate a modification of the ignition timing.

37. An internal combustion engine, comprising:
  an actuating system for operating the engine in one of a stratified combustion mode and a homogeneous combustion mode, the actuating system comprising a fuel injection system for varying an actual fuel injection quantity to the engine in response to a fuel control signal, an intake system comprising a throttle valve for varying an intake air quantity to the engine in response to an intake air control signal, and an ignition system for modifying an ignition timing of the engine in response to an ignition control signal;
  a sensor for collecting input information to determine an engine operating parameter indicative of an engine load by sensing an engine operating condition; and a controller for producing a changeover request signal requesting a changeover from a first mode that is one of the stratified mode and the homogeneous mode to a second mode that is the other of the stratified mode and the homogeneous mode in accordance with the engine operating parameter, and for changing over an actual combustion condition in the engine between the stratified combustion mode and homogeneous combustion mode by changing a desired fuel air ratio from a first desired fuel/air ratio desired for the first mode to a second desired fuel/air ratio for the second mode in response to the changeover request signal, by changing the intake air control signal from a first desired air quantity level to achieve the first desired fuel air ratio to a second desired air quantity level to achieve the second desired fuel air ratio in response to the changeover request signal while the desired fuel air ratio is at the desired fuel air ratio adapted to the homogeneous combustion mode, and by changing the fuel control signal from a first fuel control state to achieve the first desired fuel air ratio to a second fuel control state to achieve the second desired fuel air ratio, the controller being connected with the ignition system and configured to retard the ignition timing transiently from a changeover of the air control signal from the first desired air quantity level to the second desired air quantity level to eliminate an unwanted torque increase in a transient state after a changeover of the air control signal from the first desired air quantity level to the second desired air quantity level.

38. The internal combustion engine according to claim 37 wherein the controller delays a changeover of the desired fuel air ratio after a changeover of the air control signal from the first desired air quantity level to the second desired air quantity level when the changeover request signal requests a changeover from the homogeneous mode to the stratified mode, and performs a changeover of the desired fuel air ratio from the first desired fuel/air ratio to the second desired fuel/air ratio and a changeover of the air control signal from the first desired air quantity level to the second desired air quantity level simultaneously when the changeover request signal requests a changeover from the stratified mode to the homogeneous mode.

39. The internal combustion engine according to claim 2, wherein the ignition timing modification quantity is calculated based on the estimated torque variation.

\* \* \* \* \*